US008610864B2

(12) United States Patent
Lee et al.

(10) Patent No.: US 8,610,864 B2
(45) Date of Patent: Dec. 17, 2013

(54) LIQUID CRYSTAL DISPLAY

(75) Inventors: Eun-Guk Lee, Seoul (KR); Byung-Duk Yang, Yongin-si (KR); Hyang-Shik Kong, Seongnam-si (KR); Se-Hwan Yu, Asan-si (KR); Sang-ki Kwak, Cheonan-si (KR); Kyoung-Tai Han, Suwon-si (KR); Dong-Yoon Kim, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 559 days.

(21) Appl. No.: 12/560,976

(22) Filed: Sep. 16, 2009

(65) Prior Publication Data

US 2010/0195034 A1 Aug. 5, 2010

(30) Foreign Application Priority Data

Feb. 3, 2009 (KR) ........................ 10-2009-0008417

(51) Int. Cl.
*G02F 1/1343* (2006.01)
*G02F 1/1337* (2006.01)

(52) U.S. Cl.
USPC ............................ 349/144; 349/129; 349/142

(58) Field of Classification Search
USPC .................................. 349/129–131, 142–146
See application file for complete search history.

(56) References Cited

U.S. PATENT DOCUMENTS

| | | | | |
|---|---|---|---|---|
| 2003/0043336 | A1* | 3/2003 | Sasaki et al. | 349/187 |
| 2008/0297708 | A1* | 12/2008 | Yang et al. | 349/136 |
| 2009/0190058 | A1* | 7/2009 | Jung et al. | 349/48 |
| 2010/0001276 | A1* | 1/2010 | Kim et al. | 257/59 |

* cited by examiner

*Primary Examiner* — Bumsuk Won
*Assistant Examiner* — Charles Chang
(74) *Attorney, Agent, or Firm* — H.C. Park & Associates, PLC

(57) ABSTRACT

A liquid crystal display according to an exemplary embodiment of the present invention includes: a pixel electrode including a first subpixel electrode and a second subpixel electrode with a gap therebetween; a common electrode facing the pixel electrode; and a liquid crystal layer formed between the pixel electrode and the common electrode, and including a plurality of liquid crystal molecules, wherein the first and second subpixel electrodes include a plurality of minute branches, the first and second subpixel electrodes include a plurality of subregions having different length directions of the minute branches, and the width of the minute branches is wider than an interval between the neighboring minute branches.

17 Claims, 14 Drawing Sheets

LIQUID CRYSTAL DISPLAY

CROSS REFERENCE TO RELATED APPLICATION

This application claims priority from and the benefit of Korean Patent Application No. 10-2009-0008417, filed on Feb. 3, 2009, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

A liquid crystal display (LCD) is one type of the widely used flat panel displays (FPDs). The LCD is composed of two display panels on which field generating electrodes such as pixel electrodes and a common electrode are formed, and a liquid crystal layer is disposed between the two display panels. In the liquid crystal display, voltages are applied to the field generating electrodes to generate an electric field over the liquid crystal layer, which determines the alignment of liquid crystal molecules of the liquid crystal layer. Accordingly, the polarization of incident light is controlled, thereby performing image display.

A vertical alignment mode LCD, which arranges major axes of liquid crystal molecules perpendicular to the display panel in a state in which the electric field is not applied, has been developed.

In the VA mode LCD, the important issue of a wide viewing angle can be realized by forming cutouts such as minute slits in the field-generating electrodes and protrusions on the field-generating electrodes. Since the cutouts and protrusions can determine the tilt directions of the liquid crystal molecules, the tilt directions can be distributed into various directions by using the cutouts and protrusions such that the reference viewing angle is widened.

Also, a method for providing a pretilt to the liquid crystal molecules in the absence of an electric field has been developed to improve the response speed of the liquid crystal while realizing the wide viewing angle. For the liquid crystal molecules to have the pretilt in various directions, alignment layers having various alignment directions may be used, or the liquid crystal layer is applied with an electric field and a thermal or light-hardened material is added, and light may be irradiated to slope the liquid crystal molecules in predetermined directions.

On the other hand, the VA mode liquid crystal display has lower side visibility compared with front visibility, such that one pixel is divided into two subpixels and different voltages are applied to the subpixels to solve this problem.

The above information disclosed in this Background section is only for enhancement of understanding of the background of the invention and therefore it may contain information that does not form part of the prior art.

SUMMARY OF THE INVENTION

Exemplary embodiments of the present invention provide a liquid crystal display having a wide viewing angle and a fast response speed, as well as excellent visibility and transmittance.

Additional features of the invention will be set forth in the description which follows, and in part will be apparent from the description, or may be learned by practice of the invention.

A liquid crystal display according to an exemplary embodiment of the present invention includes a pixel electrode including a first subpixel electrode and a second subpixel electrode with a gap therebetween. A common electrode faces the pixel electrode and a liquid crystal layer is formed between the pixel electrode and the common electrode. The liquid crystal layer includes a plurality of liquid crystal molecules. The first subpixel electrode and the second subpixel electrode include a plurality of minute branches. The first subpixel electrode and the second subpixel electrode include a plurality of subregions having different length directions of the minute branches, and the width of the minute branches is wider than the interval between neighboring minute branches. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 9 is a top plan view of a pixel electrode of the liquid crystal display shown in

FIG. 8.

DETAILED DESCRIPTION OF THE ILLUSTRATED EMBODIMENTS

Figure 1:
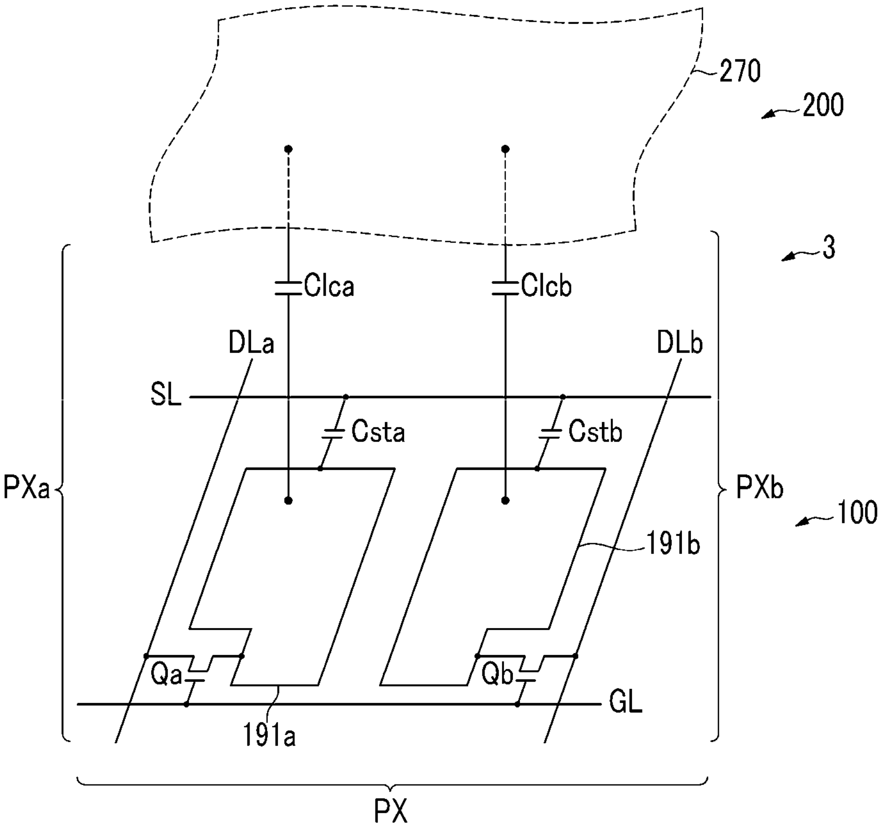
FIG. 1 is an equivalent circuit diagram of one pixel in a liquid crystal display according to an exemplary embodiment of the present invention.

The present invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers, films, panels, regions, etc., may be exaggerated for clarity. Like reference numerals in the drawings denote like elements.

It will be understood that when an element such as a layer, film, region, or substrate is referred to as being "on" or "connected to" another element, it can be directly on or directly connected to the other element or intervening elements may be present. In contrast, when an element is referred to as being "directly on" or "directly connected to" another element, there are no intervening elements present.

FIG. 1 is an equivalent circuit diagram of one pixel in a liquid crystal display according to an exemplary embodiment of the present invention.

Referring to FIG. 1, a liquid crystal display according to an exemplary embodiment of the present invention includes signal lines including a plurality of gate lines GL, a plurality of pairs of data lines DLa and DLb, and a plurality of storage electrode lines SL, and a plurality of pixels PX connected to the signal lines. From the point of view of a structure, the liquid crystal display includes a lower panel 100 and an upper panel 200 facing each other, and a liquid crystal layer 3 interposed therebetween.

Each pixel PX includes a pair of subpixels PXa and PXb. Each subpixel PXa and PXb has a respective switching element Qa and Qb, liquid crystal capacitor Clca and Clcb, and storage capacitor Csta and Cstb.

Each switching element Qa and Qb is a three-terminal element such as a thin film transistor provided on the lower panel 100, having a control terminal connected to the gate line GL, an input terminal connected to the respective data line DLa and DLb, and an output terminal connected to the respective liquid crystal capacitor Clca and Clcb and the respective storage capacitor Csta and Cstb.

Each liquid crystal capacitor Clca and Clcb uses a respective subpixel electrode 191*a* and 191*b* and a common electrode 270 as two terminals. The liquid crystal layer 3 between the electrodes 191*a* and 191*b* and 270 functions as a dielectric material.

Each storage capacitor Csta and Cstb serving as an assistant to the respective liquid crystal capacitor Clca and Clcb is formed as a storage electrode line SL provided on the lower display panel 100 and overlaps with the respective subpixel electrode 191*a* and 191*b* with an insulator interposed therebetween, and a predetermined voltage such as the common voltage Vcom is applied thereto.

A predetermined difference is generated between voltages charged to the two liquid crystal capacitors Clca and Clcb. For example, the data voltage applied to the liquid crystal capacitor Clca is less than or greater than the data voltage applied to the liquid crystal capacitor Clcb. Therefore, when the voltages of the first liquid crystal capacitor Clca and the second liquid crystal capacitor Clcb are appropriately adjusted, it is possible to make an image viewed from the side be as similar as possible to an image viewed from the front, and as a result, it is possible to improve the side visibility.

Next, a liquid crystal display according to an exemplary embodiment of the present invention will be described in detail with reference to FIG. 2, FIG. 3, FIG. 4, FIG. 5 and FIG. 6.

Figure 2:
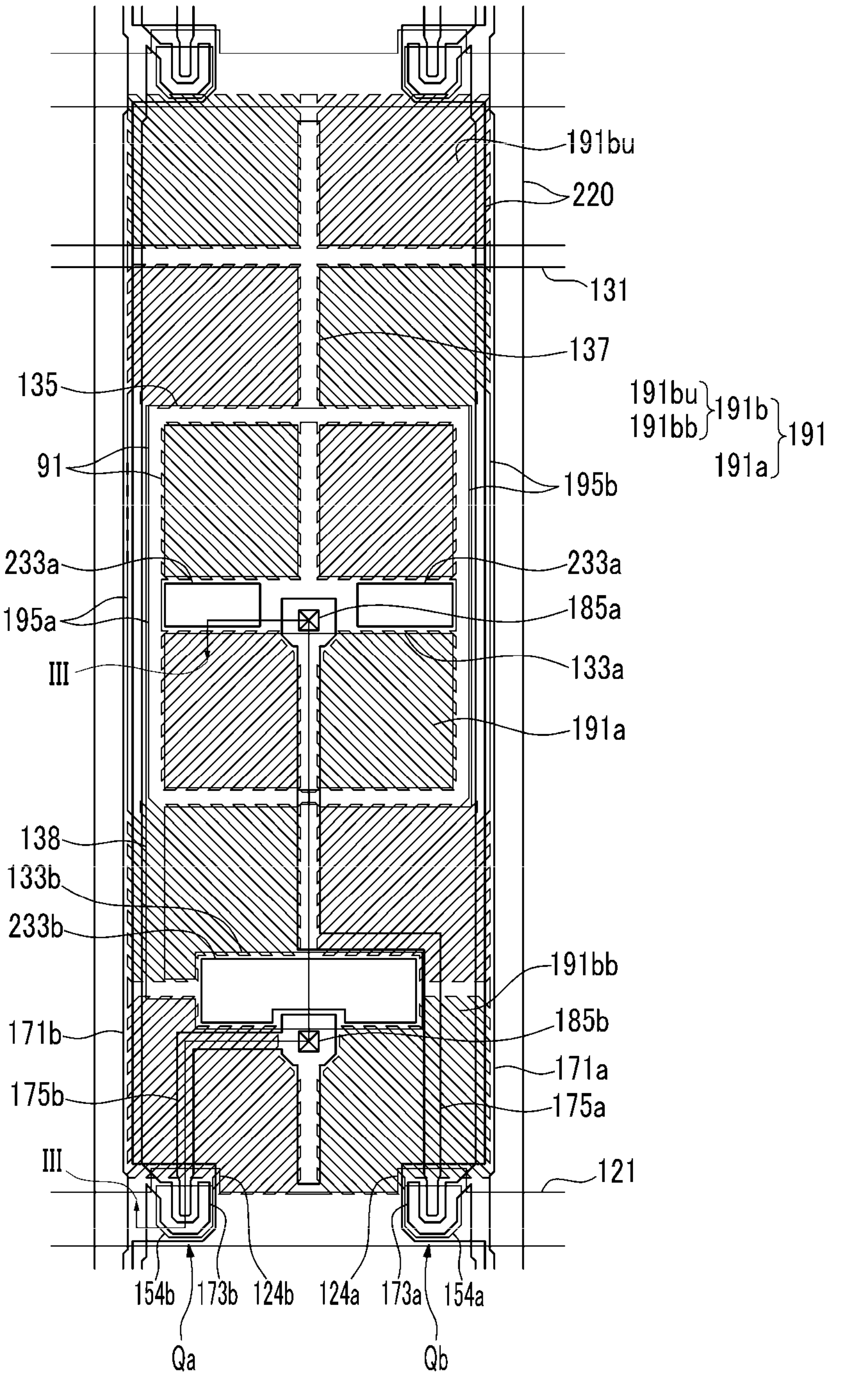
FIG. 2 is a layout view of a liquid crystal display according to an exemplary embodiment of the present invention.
Figure 3:
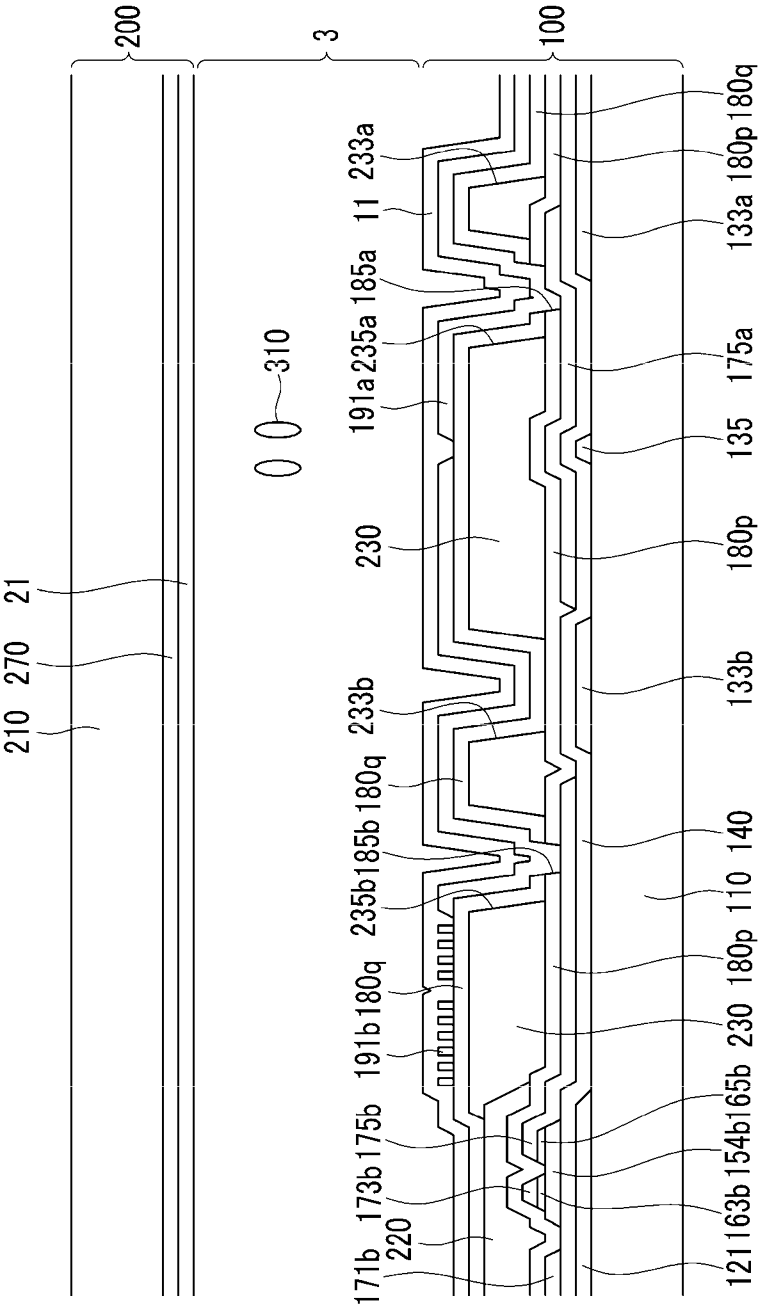
FIG. 3 is a cross-sectional view of the liquid crystal display shown in FIG. 2 taken along line III-III.
Figure 4:
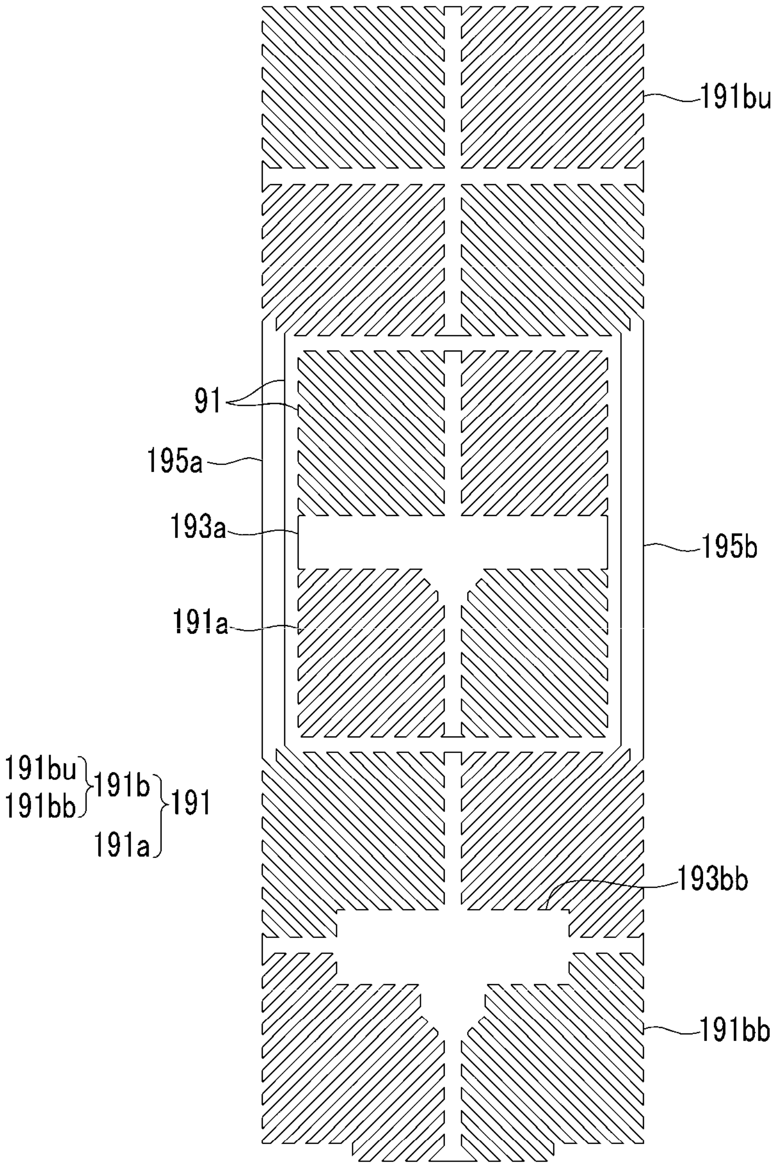
FIG. 4 is a top plan view showing the pixel electrode of the liquid crystal display shown in FIG. 2.
Figure 5:
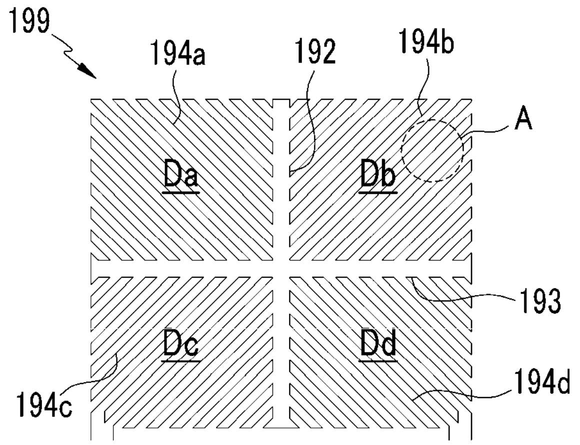
FIG. 5 is a top plan view of a basic electrode of the pixel electrode according to an exemplary embodiment of the present invention.
Figure 6:
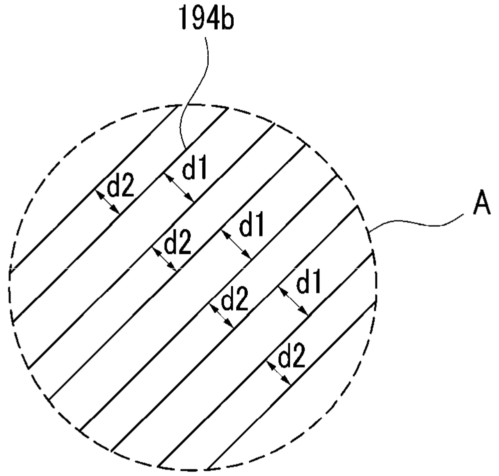
FIG. 6 is an enlarged view of portion A of the basic electrode shown in FIG. 5.

FIG. 2 is a layout view of a liquid crystal display according to an exemplary embodiment of the present invention, FIG. 3 is a cross-sectional view of the liquid crystal display shown in FIG. 2 taken along line III-III, FIG. 4 is a top plan view showing the pixel electrode of the liquid crystal display show in FIG. 2, FIG. 5 is a top plan view of a basic electrode of the pixel electrode according to an exemplary embodiment of the present invention, and FIG. 6 is an enlarged view of portion A of the basic electrode shown in FIG. 5.

Referring to FIG. 2 and FIG. 3, a liquid crystal display according to an exemplary embodiment of the present invention includes the lower panel 100 and the upper panel 200 facing each other, and the liquid crystal layer 3 interposed between two display panels 100 and 200.

Firstly, the lower panel 100 will be described.

A plurality of gate lines 121 and a plurality of storage electrode lines 131 are formed on an insulating substrate 110.

The gate lines 121 transmit gate signals and are substantially extended in the transverse direction. Each gate line 121 includes a plurality of first gate electrodes 124*a* and second gate electrodes 124*b* protruding upward.

The storage electrode lines 131 include a stem extending substantially parallel to the gate lines 121, and a plurality of branches extended from the stem. Each branch includes a longitudinal portion 137, a hook-shaped portion 135, an expansion 138, a first storage electrode 133*a*, and a second storage electrode 133*b*.

The longitudinal portion 137 is extended upward and downward from the stem (hereinafter, an imaginary straight line in the direction that the longitudinal portion 137 is extended is referred as a "longitudinal central line").

The hook-shaped portion 135 is substantially rectangular, and an upper edge thereof vertically meets the longitudinal portion 137.

The first storage electrode 133*a* extends in a transverse direction from a center of a left edge of the hook-shaped portion 135 to a center of a right edge, and has a width wider than the longitudinal portion 137 or the hook-shaped portion 135. The first storage electrode 133*a* and the longitudinal portion 137 vertically meet each other.

The left edge of the hook-shaped portion 135 is connected to the second storage electrode 133*b* through the expansion 138 that is extended downward and is curved in the right direction. The width of the second storage electrode 133*b* is expanded and is extended substantially parallel to the first storage electrode 133*a* in the transverse direction.

However, the shapes and arrangements of the storage electrode lines 131, 133*a*, 133*b*, 135, 137, and 138 may be modified in various forms.

A gate insulating layer 140 is formed on the gate lines 121 and the storage electrode lines 131, 133*a*, 133*b*, 135, 137, and 138, and a plurality of semiconductors 154*a* and 154*b* preferably made of amorphous or crystallized silicon are formed on the gate insulating layer 140.

A plurality of pairs of ohmic contacts 163*b* and 165*b* are formed on the first semiconductor 154*b*, and the ohmic contacts 163*b* and 165*b* may be formed of a material such as n+ hydrogenated amorphous silicon in which an n-type impurity is doped with a high concentration, or of silicide.

A plurality of pairs of data lines 171*a* and 171*b* and a plurality of pairs of first drain electrodes 175*a* and second drain electrodes 175*b* are formed on the ohmic contacts 163*b* and 165*b*, and on the gate insulating layer 140.

The data lines 171*a* and 171*b* transmit data signals, extend substantially in the longitudinal direction, and cross the gate lines 121 and the storage electrode lines 131. Each data line 171*a* and 171*b* includes a plurality of first source electrodes 173*a* and second source electrodes 173*b* extending toward the respective first gate electrodes 124*a* and second gate electrodes 124*b* and are curved with a "U" shape. The first source electrodes 173*a* and the second source electrodes 173*b* are opposite to the respective first drain electrodes 175*a* and second drain electrodes 175*b* with respect to the first gate electrodes 124*a* and the second gate electrodes 124*b*.

Each first drain electrode 175*a* starts from one end enclosed by the first source electrode 173*a*, extends upward, curves in the left direction according to the upper edge of the second storage electrode 133*b*, and again extends upward near the longitudinal central line to form the other end. The other end of the first drain electrode 175*a* is extended to where the second storage electrode 133*b* is disposed, and has a wide area for connection with another layer.

Each second drain electrode 175*b* starts from one end enclosed by the second source electrode 173*b*, extends upward to the second storage electrode 133*b*, curves in the right direction, extends according to the lower edge of the second storage electrode 133*b*, expands with a wide area near the longitudinal central line, and again extends downward.

However, the shapes and arrangements of the first drain electrodes 175*a* and the second drain electrodes 175*b* and the data lines 171*a* and 171*b* may be modified in various forms.

A first gate electrode 124*a* and a second gate electrode 124*b*, a first source electrode 173*a* and a second source electrode 173*b*, and a first drain electrode 175*a* and a second drain electrode 175*b* respectively form a first thin film transistor (TFT) Qa and a second TFT Qb along with a first semiconductor 154*a* and a second semiconductor 154*b*, and a channel of the first TFT Qa and the second TFT Qb is formed on the first semiconductor 154*a* and the second semiconductor 154*b* between the first source electrode 173*a* and the second source electrode 173*b* and the first drain electrode 175*a* and the second drain electrode 175*b*.

The ohmic contacts 163*b* and 165*b* are interposed only between the underlying semiconductor islands 154*a* and 154*b*, and the overlying data lines 171*a* and 171*b* and drain electrodes 175*a* and 175*b*, and reduce contact resistance between them. The semiconductors 154*a* and 154*b* have a portion that is exposed without being covered by the data lines 171*a* and 171*b* and the drain electrodes 175*a* and 175*b*, and a portion between the source electrodes 173*a* and 173*b* and the respective drain electrodes 175*a* and 175*b*.

A lower passivation layer 180*p* preferably made of silicon nitride or silicon oxide is formed on the data lines 171*a* and 171*b*, the drain electrodes 175*a* and 175*b*, and the exposed portions of the semiconductors 154*a* and 154*b*.

A plurality of light blocking members 220 referred to as a black matrix and separated by a predetermined interval from each other are formed on the lower passivation layer 180*p*. The light blocking members 220 may include a stripe portion extending upward and downward, and a quadrangle portion corresponding to the thin film transistor, and they prevent light leakage.

A plurality of color filters 230 are formed on the lower passivation layer 180*p* and the light blocking members 220. The color filters 230 are mostly formed in a region surrounded by the light blocking members 220. The color filters 230 have a plurality of holes 235*a* and 235*b* disposed on the first drain electrodes 175*a* and the second drain electrodes 175*b*, and a plurality of openings 233*a* and 233*b* disposed on the first storage electrodes 133*a* and the second storage electrodes 133*b*. The opening 233*a* and 233*b* reduce the thickness of the dielectric material forming the storage capacitors Csta and Cstb such that the storage capacitance may be increased.

Here, the lower passivation layer 180*p* may prevent the pigments of the color filters 230 from flowing into the exposed semiconductors 154*a* and 154*b*.

An upper passivation layer 180*q* is formed on the light blocking members 220 and the color filters 230. The upper passivation layer 180*q* may be made of an inorganic insulating material such as silicon nitride or silicon oxide, and prevents the color filters 230 from lifting and suppresses contamination of the liquid crystal layer 3 by organic material such as a solvent flowing from the color filters 230 such that defects such as an afterimage that may be generated during driving may be prevented.

However, at least one of the light blocking members 220 and the color filters 230 may be disposed on the upper panel 200, and one of the lower passivation layer 180*p* and the upper passivation layer 180*q* of the lower panel 100 may be omitted in this case.

The upper passivation layer 180*q* and the lower passivation layer 180*p* have a plurality of contact holes 185*a* and 185*b* respectively exposing the first drain electrodes 175*a* and the second drain electrodes 175*b*.

A plurality of pixel electrodes 191 are formed on the upper passivation layer 180*q*, and the above-described color filters 230 may be extended according to a column of the pixel electrodes 191.

Referring to FIG. 4, each pixel electrode 191 includes the first subpixel electrode 191*a* and the second subpixel electrode 191*b* that are separated from each other by a gap 91 of a quadrangular belt shape, and each first subpixel electrode 191*a* and each second subpixel electrode 191*b* respectively include a basic electrode 199 shown in FIG. 5, or at least one modification thereof.

Next, the basic electrode 199 will be described in detail with reference to FIG. 5.

As shown in FIG. 5, the overall shape of the basic electrode 199 is a quadrangle, and it includes a cross-shaped stem having a transverse stem 193 and a longitudinal stem 192 that are crossed. Also, the basic electrode 199 is divided into a first subregion Da, a second subregion Db, a third subregion Dc, and a fourth subregion Dd by the transverse stem 193 and the longitudinal stem 192. The first subregion Da includes a plurality of first minute branches 194*a*, the second subregion Db includes a plurality of second minute branches 194*b*, the third subregion Dc includes a plurality of third minute branches 194*c*, and the fourth subregion Dd includes a plurality of fourth minute branches 194*d*.

The first minute branches 194*a* obliquely extend from the transverse stem 193 or the longitudinal stem 192 in the upper-left direction, and the second minute branches 194*b* obliquely extend from the transverse stem 193 or the longitudinal stem 192 in the upper-right direction. Also, the third minute branches 194*c* obliquely extend from the transverse stem 193 or the longitudinal stem 192 in the lower-left direction, and the fourth minute branches 194*d* obliquely extend from the transverse stem 193 or the longitudinal stem 192 in the lower-right direction.

The first minute branches 194*a*, the second minute branches 194*b*, the third minute branches 194*c* and the fourth minute branches 194*d* form an angle of about 45 degrees or 135 degrees with the gate lines 121 or the transverse stem 193. Also, the minute branches 194*a*, 194*b*, 194*c* and 194*d* of two neighboring subregions Da, Db, Dc and Dd may be crossed.

Next, widths of the minute branches 194*a*, 194*b*, 194*c* and 194*d* of the pixel electrodes 191 of the liquid crystal display according to an exemplary embodiment of the present invention, and intervals between neighboring minute branches 194*a*, 194*b*, 194*c* and 194*d* within each subregion Da, Db, Dc and Dd, will be described with reference to FIG. 6. FIG. 6 is an enlarged view of portion A of the basic electrode shown in FIG. 5.

As shown in FIG. 6 using the minute branches 194*b* of the second subregion Db for illustration, the width d1 of the minute branches 194*a*, 194*b*, 194*c* and 194*d* of the liquid crystal display according to an exemplary embodiment of the present invention may be wider than the interval d2 between the neighboring minute branches 194*a*, 194*b*, 194*c*, 194*d* in each of the respective subregions Da, Db, Dc and Dd. Also, the ratio d1/d2 of the width d1 of the minute branches 194*a*, 194*b*, 194*c*, 194*d* to the width of the interval d2 between respective neighboring minute branches 194*a*, 194*b*, 194*c*, 194*d* may be changed according to the sum of the width d1 of the minute branches 194*a*, 194*b*, 194*c*, 194*d* and the interval d2 between the respective neighboring minute branches 194*a*, 194*b*, 194*c*, 194*d*.

In detail, when the sum of the width d1 of the minute branches 194*a*, 194*b*, 194*c*, 194*d* and the interval d2 between respective neighboring minute branches 194*a*, 194*b*, 194*c*, 194*d* in the liquid crystal display according to an exemplary embodiment of the present invention is in a range from about 6 μm to 6.5 μm, the ratio d1/d2 of the width d1 of the minute branches 194*a*, 194*b*, 194*c*, 194*d* to the interval d2 between respective neighboring minute branches 194*a*, 194*b*, 194*c*, 194*d* may be in a range from about 1.2 to 1.35. Also, when the sum of the width d1 of the minute branches 194*a*, 194*b*, 194*c*, 194*d* and the interval d2 between respective neighboring minute branches 194*a*, 194*b*, 194*c*, 194*d* is in a range from about 6.5 μm to 7 μm, the ratio d1/d2 of the width d1 of the minute branches 194*a*, 194*b*, 194*c*, 194*d* to the interval d2 between respective neighboring minute branches 194*a*, 194*b*, 194*c*, 194*d* may be in a range from about 1.35 to 1.5. Further, when the sum of the width d1 of the minute branches 194*a*, 194*b*, 194*c*, 194*d* and the interval d2 between respective neighboring minute branches 194*a*, 194*b*, 194*c*, 194*d* is in a range from about 5 μm to 6 μm, the ratio d1/d2 of the width d1 of the minute branches 194*a*, 194*b*, 194*c*, 194*d* to the interval d2 between respective neighboring minute branches 194*a*, 194*b*, 194*c*, 194*d* may be in a range from about 1.05 to 1.2. In addition, when the sum of the width d1 of the minute branches 194*a*, 194*b*, 194*c*, 194*d* and the interval d2 between respective neighboring minute branches 194*a*, 194*b*, 194*c*, 194*d* is greater than 7 μm, the ratio d1/d2 of the width d1 of the minute branches 194*a*, 194*b*, 194*c*, 194*d* to the interval d2 between the respective neighboring minute branches 194*a*, 194*b*, 194*c*, 194*d* may be greater than 1.5.

Again, referring to FIG. 2, FIG. 3, FIG. 4 and FIG. 5, the first subpixel electrode 191*a* includes one basic electrode 199. The transverse stem 193 of the basic electrode 199 forming the first subpixel electrode 191*a* expands downward and upward to form a first expansion 193*a*, and the first expansion 193*a* overlaps the first storage electrode 133*a*. Also, a protrusion that protrudes downward for easy contact with the first drain electrode 175*a* is formed in the center of the downward edge of the first expansion 193*a*.

The second subpixel electrode 191*b* includes an upper electrode 191*bu* and a lower electrode 191*bb*, and the upper electrode 191*bu* and the lower electrode 191*bb* each include one basic electrode 199. The upper electrode 191*bu* and the lower electrode 191*bb* are connected to each other through a left connection 195*a* and a right connection 195*b*.

The second subpixel electrode 191*b* encloses the first subpixel electrode 191*a* with the gap 91 therebetween. A portion of the center of the transverse stem of the lower electrode 191*bb* extends upward and downward to form a second expansion 193*bb* overlapping the second storage electrode 133*b*. Also, a protrusion that protrudes downward for easy contact with the second drain electrode 175*b* is formed in the center of the downward edge of the second expansion 193*bb*.

The area of the second subpixel electrode 191*b* may be about 1.0 to 2.2 times the area of the first subpixel electrode 191*a*.

Each first subpixel electrode 191*a* and second subpixel electrode 191*b* is physically and electrically connected to the respective first drain electrode 175*a* and second drain electrode 175*b* through the respective contact holes 185*a* and 185*b*, and receives data voltages from the respective first drain electrode 175*a* and second drain electrode 175*b*.

On the other hand, the upper electrode 191*bu* may be directly applied with the data voltages from the second drain electrode 175*b*. In this case, the second drain electrode 175*b* extends to the upper electrode 191*bu*, and a contact hole (not shown) for contact of the upper electrode 191*bu* and the second drain electrode 175*b* is required. In this case, the left and right connections 195*a* and 195*b* are not necessary.

An alignment layer 11 is formed on the pixel electrodes 191.

Next, the upper panel 200 will be described.

The common electrode 270 is formed on an insulating substrate 210, and an alignment layer 21 is formed thereon.

Each of the alignment layers 11 and 21 may be a vertical alignment layer.

Finally, polarizers (not shown) may be provided on the outer surface of the display panels 100 and 200.

Figure 7:
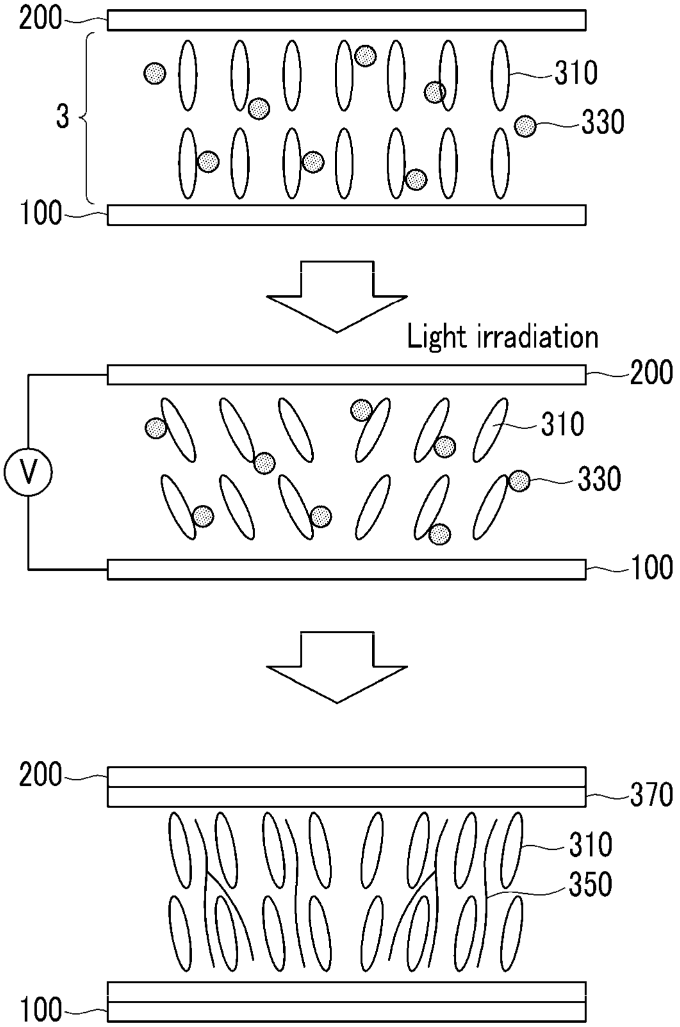
FIG. 7 is a view showing a process of providing a pretilt angle to liquid crystal molecules by using prepolymers that are polarized by light such as ultraviolet rays.

The liquid crystal layer 3 interposed between the lower panel 100 and the upper panel 200 includes liquid crystal molecules 310 and polymers 350 and 370 having negative dielectric anisotropy (see FIG. 7).

The liquid crystal molecules 310 are pretilted by the polymers 350 and 370 for the long axis thereof to be about parallel to the length direction of respective first minute branches 194*a*, second minute branches 194*b*, third minute branches 194*c* and fourth minute branches 194*d* of the first subpixel electrode 191*a* and the second subpixel electrode 191*b*. The liquid crystal molecules 310 are aligned vertically with respect to the surfaces of the two display panels 100 and 200. Accordingly, the first and second subpixels PXa and PXb respectively include four subregions Da, Db, Dc and Dd having different pretilt directions of the liquid crystal.

If the gate lines 121 are applied with the gate signals, the data voltage is applied to the first subpixel electrodes 191*a* and the second subpixel electrodes 191*b* through the data lines 171*a* and 171*b*. Then, the first subpixel electrodes 191*a* and the second subpixel electrodes 191*b* applied with the data voltage and the common electrode 270 applied with the common voltage generate an electric field to the liquid crystal layer 3. Accordingly, the liquid crystal molecules 310 of the liquid crystal layer 3 are arranged in response of the electric field such that the major axes of the liquid crystal molecules 310 tend to change the direction to be perpendicular to the direction of the electric field. The inclination degree of the liquid crystal molecules 310 changes the degree of polarization of light incident to the liquid crystal layer 3. The change in degree of polarization is proportional to the inclination degree of the liquid crystal molecules 310, and this change of the incident light polarization is represented with a change of transmittance by a polarizer, and thereby a liquid crystal display displays an image.

On the other hand, the edges of the minute branches 194*a*, 194*b*, 194*c*, 194*d* distort the electric field to make horizontal components of the electric field perpendicular to the edges of the minute branches 194*a*, 194*b*, 194*c*, 194*d*, and the inclination direction of the liquid crystal molecules 310 is determined in the direction determined by the horizontal components of the electric field. Accordingly, the liquid crystal molecules 310 firstly tend to tilt in the direction perpendicular to the edges of the minute branches 194*a*, 194*b*, 194*c*, 194*d*. However, the directions of the horizontal components of the electric field by the respective neighboring minute branches 194*a*, 194*b*, 194*c*, 194*d* are opposite to each other and the intervals d2 between the respective minute branches 194*a*, 194*b*, 194*c*, 194*d* are narrow such that the liquid crystal molecules 310 which tend to arrange in the opposite directions are tilted in the direction parallel to the length direction of the minute branches 194*a*, 194*b*, 194*c*, 194*d*. Accordingly, as the exemplary embodiment of the present invention, if the liquid crystal molecules 310 are initially not pretilted in the length direction of the minute branches 194*a*, 194*b*, 194*c*, 194*d*, the liquid crystal molecules 310 are tilted in the length direction of the minute branches 194*a*, 194*b*, 194*c*, 194*d* through two steps. However, in the present exemplary embodiment, the liquid crystal molecules 310 are already pretilted in the direction parallel to the length direction of the minute branches 194*a*, 194*b*, 194*c*, 194*d* such that the liquid crystal molecules 310 are not tilted in the direction parallel to the length direction of the minute branches 194*a*, 194*b*, 194*c*, 194*d* through two steps, but are tilted in the pretilted direction through one step. Therefore, if the liquid crystal molecules 310 are provided to have the pretilt, they are tilted in the required direction one time such that the response speed of the liquid crystal display may be improved.

Also, in an exemplary embodiment of the present invention, the length directions in which the minute branches 194*a*, 194*b*, 194*c*, 194*d* are extended in one pixel PX are all four directions such that the inclined directions of the liquid crystal molecules 310 are in all four directions. Therefore, the viewing angle of the liquid crystal display is widened by varying the inclined directions of the liquid crystal molecules 310.

On the other hand, the transmittance of the liquid crystal display is increased with the increasing of the width d1 of the first minute branches 194*a*, the second minute branches 194*b*, the third minute branches 194*c* and the fourth minute branches 194*d* and the decreasing of the interval d2 between respective neighboring minute branches 194*a*, 194*b*, 194*c*, 194*d* within respective subregions Da, Db, Dc and Dd, however if the interval d2 between respective neighboring first minute branches 194*a*, second minute branches 194*b*, third minute branches 194*c* and fourth minute branches 194*d* is excessively large compared with the width d1 of the minute branches 194*a*, 194*b*, 194*c*, 194*d*, it is difficult for the liquid crystal molecules to be inclined in the direction parallel to the length direction of the minute branches 194*a*, 194*b*, 194*c*, 194*d*. Accordingly, the width d1 of the first minute branches 194*a*, the second minute branches 194*b*, the third minute branches 194*c* and the fourth minute branches 194*d* and the interval d2 between respective neighboring minute branches 194*a*, 194*b*, 194*c*, 194*d* are controlled to increase the transmittance of the liquid crystal display while controlling the liquid crystal molecules 310 to be inclined in the length direction of the minute branches 194*a*, 194*b*, 194*c*, 194*d* such that the transmittance of the liquid crystal display may be increased.

As above-described, in the liquid crystal display according to an exemplary embodiment of the present invention, when the sum of the width d1 of the minute branches 194*a*, 194*b*, 194*c*, 194*d* and the interval d2 between respective neighboring minute branches 194*a*, 194*b*, 194*c*, 194*d* is in the range from about 6 μm to 6.5 μm, the ratio d1/d2 may be in the range from about 1.2 to 1.35, when the sum of the width d1 and the interval d2 is in the range from about 6.5 μm to 7 μm, the ratio d1/d2 may be in the range from about 1.35 to 1.5, when the sum of the width d1 and the interval d2 is in the range from about 5 μm to 6 μm, the ratio d1/d2 may be in the range from about 1.05 to 1.2, and when the sum of the width d1 and the interval d2 is greater than 7 μm, the ratio d1/d2 may be greater than 1.5. As above-described, the width d1 of the minute branches 194*a*, 194*b*, 194*c*, 194*d* is wider than the interval d2 between the respective neighboring minute branches 194*a*, 194*b*, 194*c*, 194*d*, and the ratio d1/d2 of the width d1 to the interval d2 is controlled according to the sum of the width d1 and the interval d2 such that the transmittance of the liquid crystal display may be increased while inclining the liquid crystal molecule in the length direction of the minute branches 194*a*, 194*b*, 194*c*, 194*d*.

The first sub-pixel electrode 191*a* and the common electrode 270 form the first liquid crystal capacitor Clca and the second sub-pixel electrode 191*b* and the common electrode 270 form the second liquid crystal capacitor Clcb to maintain an applied voltage even after the TFT is turned off. Also, the first storage electrode 133*a* and the second storage electrode 133*b* of the storage electrode line 131 respectively overlap the first subpixel electrode 191*a* and the second subpixel electrode 191*b* in the openings 233*a* and 233*b* to form the storage capacitors Csta and Cstb.

The hook-shaped portion 135 of the storage electrode line 131 overlaps the gap 91 of the pixel electrode 191 such that it functions as a shielding member for blocking the light leakage between the first subpixel electrode 191*a* and the second subpixel electrode 191*b*. The hook-shaped portion 135 disposed between the data lines 171*a* and 171*b* and the first subpixel electrode 191*a* prevents crosstalk to thereby reduce the degradation of the display quality.

Also, in the structure of pixel electrode 191 in an exemplary embodiment of the present invention, the direction of the liquid crystal molecules 310 is not controlled near the longitudinal and transverse stems of the first subpixel electrode 191*a* and the second subpixel electrode 191*b* such that texture may be generated. Accordingly, the storage electrode line 131, the longitudinal portion 137 of the storage electrode line 131, the first storage electrode 133*a* and the second storage electrode 133*b* overlap the transverse stem or the longitudinal stem of the first subpixel electrode 191*a* and the second subpixel electrode 191*b* such that the texture may be covered, and so the aperture ratio may be simultaneously increased.

On the other hand, the first subpixel electrode 191*a* and the second subpixel electrode 191*b* are applied with different data voltages through the different data lines 171*a* and 171*b*, and the voltage of the first subpixel electrode 191*a* having the relatively smaller area is higher than the voltage of the second subpixel electrode 191*b* having the relatively larger area.

In this way, when the voltages of the first sub-pixel electrode 191*a* and the second sub-pixel electrode 191*b* are different from each other, the voltage applied to the first liquid crystal capacitor Clca formed between the first sub-pixel electrode 191*a* and the common electrode 270 and the voltage applied to the second liquid crystal capacitor Clcb formed between the second sub-pixel electrode 191*b* and the common electrode 270 are different from each other such that the declination angle of the liquid crystal molecules of the subpixels PXa and PXb are different from each other, and as a result the luminance of the two subpixels become different. Accordingly, if the voltages of the first liquid crystal capacitor Clca and the second liquid crystal capacitor Clcb are appropriately controlled, the images shown at the side of the liquid crystal display may be approximate to the images shown at the front of the liquid crystal display, that is to say, the gamma curve of the side may be approximately close to the gamma curve of the front, thereby improving the side visibility.

Also, in an exemplary embodiment of the present invention, when the first subpixel electrode 191*a* applied with the higher voltage is disposed in the central part of the pixel PX, and the first subpixel electrode 191*a* is farther apart from gate line 121 such that an overlapping portion therebetween is not generated, kick-back voltage is reduced and flicker is removed.

Next, the initial alignment method for providing a pretilt angle to liquid crystal molecules 310 will be described with reference to FIG. 7.

FIG. 7 is a view showing a process of providing a pretilt angle to liquid crystal molecules by using prepolymers that are polarized by light such as ultraviolet rays.

Prepolymers 330 such as monomers that are hardened through polymerization by light such as ultraviolet rays are inserted between two display panels 100 and 200 along with the liquid crystal material. The prepolymers 330 may be a reactive mesogen that is polymerized by light such as ultraviolet rays.

Next, the first subpixel electrode 191*a* and the second subpixel electrode 191*b* are applied with the data voltages and the common electrode 270 of the upper panel 200 is applied with the common voltage to generate an electric field to the liquid crystal layer 3 between the two display panels 100 and 200. Thus, the liquid crystal molecules 310 of the liquid crystal layer 3 are inclined in the direction parallel to the length direction of the minute branches 194*a*, 194*b*, 194*c*, 194*d* through two steps as above-described in response to the electric field, and the liquid crystal molecules 310 in one pixel PX are inclined in a total of four directions.

If the light such as ultraviolet rays is irradiated after the application of the electric field to the liquid crystal layer 3, the prepolymers 330 are polymerized such that a first polymer 350 and a second polymer 370 are formed as shown in FIG. 7.

The first polymer 350 is formed in the liquid crystal layer 3, and the second polymer 370 is formed close to the display panels 100 and 200. The alignment direction is determined for the liquid crystal molecules 310 to have the pretilt in the length direction of the minute branches 194*a*, 194*b*, 194*c*, 194*d* by the first polymer 350 and the second polymer 370.

Accordingly, the liquid crystal molecules 310 are arranged with the pretilts of four different directions under non-application of the voltage to the electrodes 191 and 270.

Next, another exemplary embodiment of the present invention will be described with the reference to FIG. 8, FIG. 9 and FIG. 10.

Figure 8:
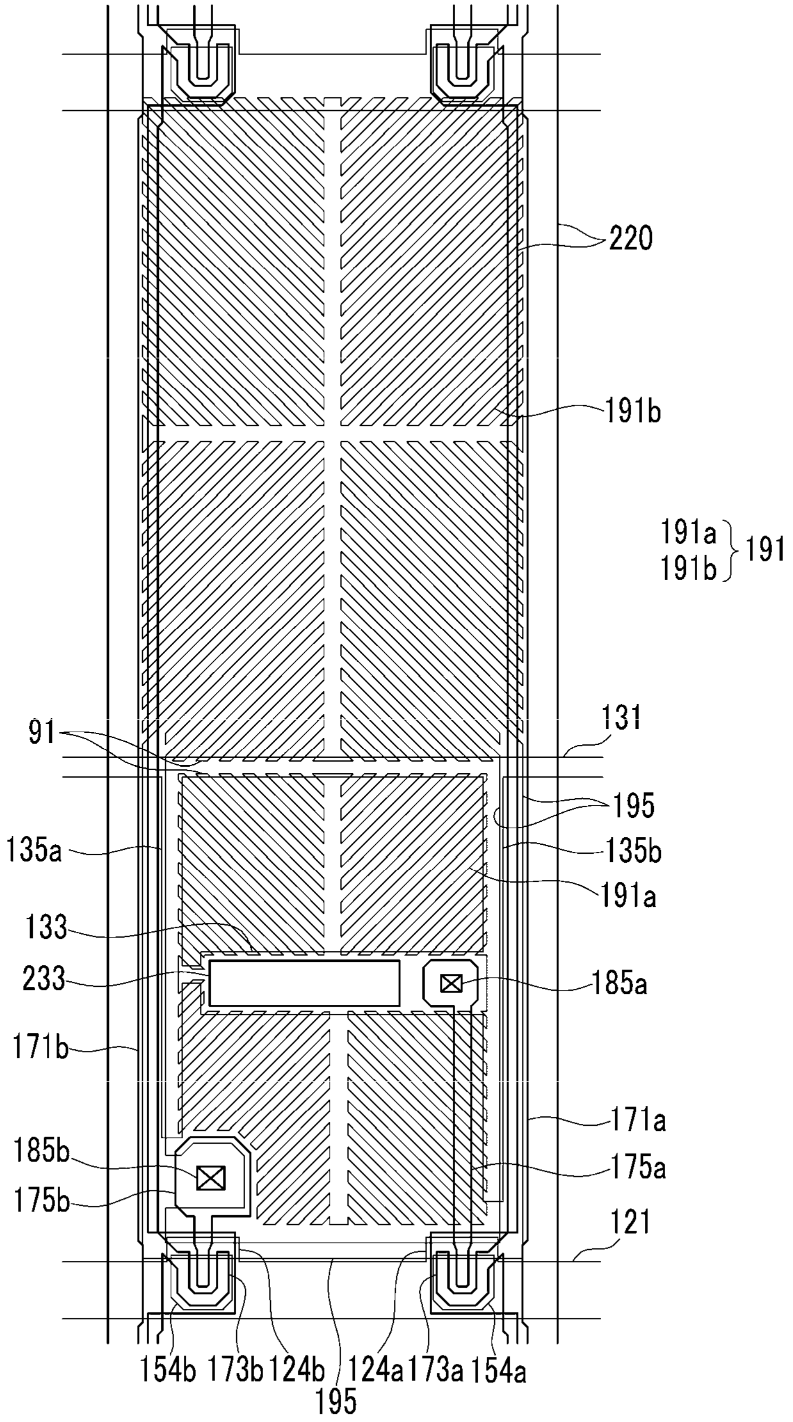
FIG. 8 is a layout view of a liquid crystal display according to another exemplary embodiment of the present invention.
Figure 9:
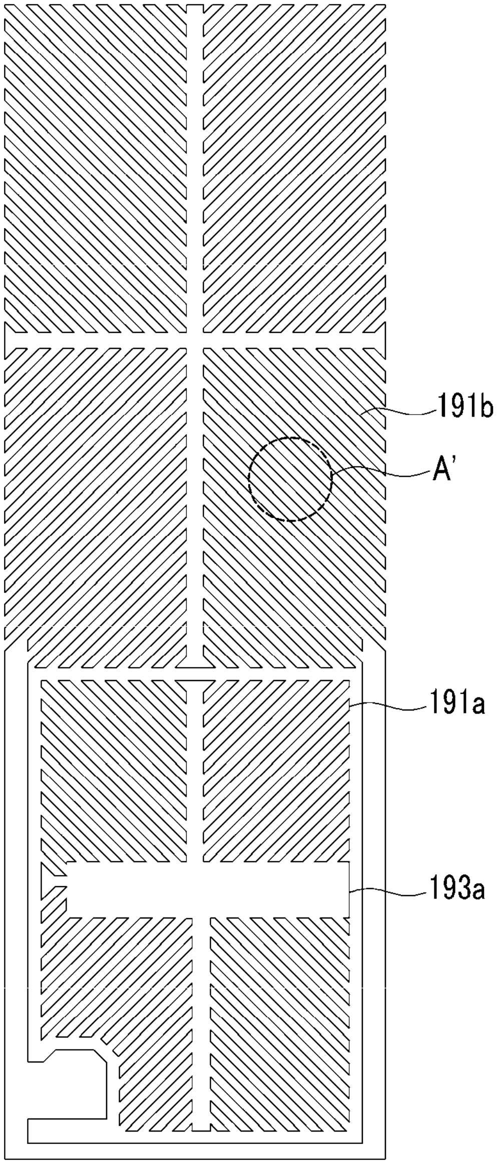
Figure 10:
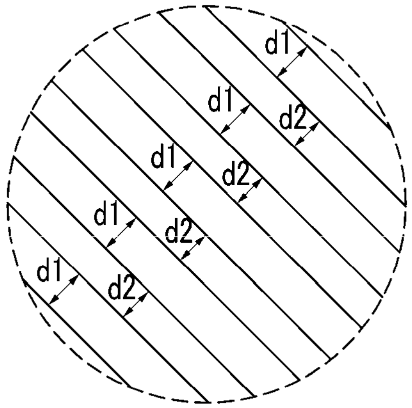
FIG. 10 is an enlarged view of portion A' of the basic electrode shown in FIG. 9.

FIG. 8 is a layout view of a liquid crystal display according to another exemplary embodiment of the present invention, FIG. 9 is a top plan view of a pixel electrode of the liquid crystal display shown in FIG. 8, and FIG. 10 is an enlarged view of portion A' of the basic electrode shown in FIG. 9.

The layered structure of the liquid crystal display according to the present exemplary embodiment is almost the same as the layered structure of the liquid crystal display shown in FIG. 2, FIG. 3 and FIG. 4. Hereafter, different characteristics from the previously described exemplary embodiment will be mainly described.

Referring to FIG. 8, FIG. 9 and FIG. 10, the storage electrode line 131 includes a left longitudinal portion 135*a* and a right longitudinal portion 135*b* extending downward from the storage electrode line 131, and a storage electrode 133 protruding in the right direction from the left longitudinal portion 135*a*. The storage electrode 133 has a wider width than that of the other portions of the storage electrode line 131 for overlapping with a pixel electrode 191 to be described later.

The first drain electrode 175*a* includes one end having a wide area lengthily extending upward, and the second drain electrode 175*b* includes one end having a wide area shortly extending upward.

The color filters (not shown) have through holes (not shown) where contact holes 185*a* and 185*b* are passed through and an opening 233 disposed on the storage electrode 133, and an upper passivation layer (not shown) and a lower passivation layer (not shown) have a plurality of contact holes 185*a* and 185*b* exposing the first drain electrodes 175*a* and the second drain electrode 175*b*, respectively.

The pixel electrode 191 according to the present exemplary embodiment also includes the first subpixel electrodes 191*a* and the second subpixel electrode 191*b* that are separated from each other by a gap 91 of a quadrangular belt shape therebetween, like the exemplary embodiment show in FIG. 2, FIG. 3 and FIG. 4.

The first subpixel electrode 191*a* is made of one basic electrode 199 shown in FIG. 5. A transverse stem of the first subpixel electrode 191*a* is expanded upward and downward to form an expansion 193*a*, and the expansion 193*a* overlaps the storage electrode 133 in an opening 233 to form a storage capacitor Csta.

The second subpixel electrode 191*b* includes one basic electrode 199, and a connection bridge 195 enclosing the first subpixel electrode 191*a*, which is disposed below with the gap 91 interposed therebetween.

The left lower portion of the connection bridge 195 is protruded in the right direction with a wide area for contact with the second drain electrode 175*b*. As shown in FIG. 8, the second subpixel electrode 191*b* receives data voltages from the second drain electrode 175*b* through the connection bridge 195.

The lower transverse edge of the connection bridge 195 overlaps a portion of the gate line 121 to prevent the first subpixel electrode 191*a* from being influenced by the gate signals of the gate lines 121.

Both longitudinal edges of the connection bridge 195 cover the data lines 171*a* and 171*b* for preventing crosstalk between the data signal and the first subpixel electrode 191*a*.

The width of the connection bridge 195 may be in a range from 5.0 μm to 15 μm.

The storage electrode line 131 overlaps the gap 91 of the pixel electrode 191 to block light leakage between the first subpixel electrode 191*a* and the second subpixel electrode 191*b*. Also, the right longitudinal portion 135*a* and the left longitudinal portion 135*b* of the storage electrode line 131 are disposed between the first subpixel electrode 191*a* and the data lines 171*a* and 171*b*, to prevent crosstalk between the data lines 171*a* and 171*b* and the first subpixel electrode 191*a*.

The area of the second subpixel electrode 191*b* may be in a range from about 1.25 to 2.75 times the area of the first subpixel electrode 191*a*.

Differently from the above-described exemplary embodiment, according to the present exemplary embodiment, the first drain electrode 175*a* and the second drain electrode 175*b* do not overlap the second subpixel electrode 191*b* and the first subpixel electrode 191*a* applied with data voltages of different polarities, but overlap the first subpixel electrode 191*a* and the second subpixel electrode 191*b* applied with data voltages of the same polarity such that the texture caused by the distortion of the electric field is not generated near the first drain electrode 175*a* and the second drain electrode 175*b* even though the first data line 171*a* and the second data line 171*b* are applied with data voltages of opposite polarities.

Accordingly, according to the present exemplary embodiment, the texture may be prevented, thereby increasing the transmittance.

Also, according to the present exemplary embodiment, the contact holes 185*a* and 185*b* are disposed on the edges or corners of the first subpixel PXa and the second subpixel PXb such that it is easy to form color filters (not shown) by an inkjet process.

Like the above-described exemplary embodiment, the liquid crystal molecules are inclined in the four directions in the case of the present exemplary embodiment such that the viewing angle of the liquid crystal display may be increased, and the liquid crystal molecules have the pretilt through the polymerization of the prepolymer such that the response speed may be improved. Also, the first subpixel electrode 191*a* and the second subpixel electrode 191*b* are applied with different data voltages, thereby improving the side visibility.

As shown in FIG. 10, in the liquid crystal display according to the present exemplary embodiment, when the sum of the width d1 of the minute branches 194*a*, 194*b*, 194*c*, 194*d* and the interval d2 between the respective neighboring minute branches 194*a*, 194*b*, 194*c*, 194*d* is in the range from about 6 μm to 6.5 μm, the ratio d1/d2 may be in the range from about 1.2 to 1.35, when the sum of the width d1 and the interval d2 is in the range from about 6.5 μm to 7 μm, the ratio d1/d2 may be in the range from about 1.35 to 1.5, when the sum of the width d1 and the interval d2 is in the range from about 5 μm to 6 μm, the ratio d1/d2 may be in the range from about 1.05 to 1.2, and when the sum of the width d1 and the interval d2 is greater than 7 μm, the ratio d1/d2 may be greater than 1.5. As above-described, the width d1 of the minute branches 194*a*, 194*b*, 194*c*, 194*d* is wider than the interval d2 between the respective neighboring minute branches 194*a*, 194*b*, 194*c*, 194*d*, and the ratio d1/d2 of the width d1 of the minute branches 194*a*, 194*b*, 194*c*, 194*d* to the interval d2 between the respective neighboring minute branches 194*a*, 194*b*, 194*c*, 194*d* is controlled according to the sum of the width d1 of the minute branches 194*a*, 194*b*, 194*c*, 194*d* and the interval d2 between the respective neighboring minute branches 194*a*, 194*b*, 194*c*, 194*d* such that the transmittance of the liquid crystal display may be increased while inclining the liquid crystal molecule in the length direction of the minute branches 194*a*, 194*b*, 194*c*, 194*d*.

Next, another exemplary embodiment of the present invention will be described with reference to FIG. 11 and FIG. 12.

Figure 11:
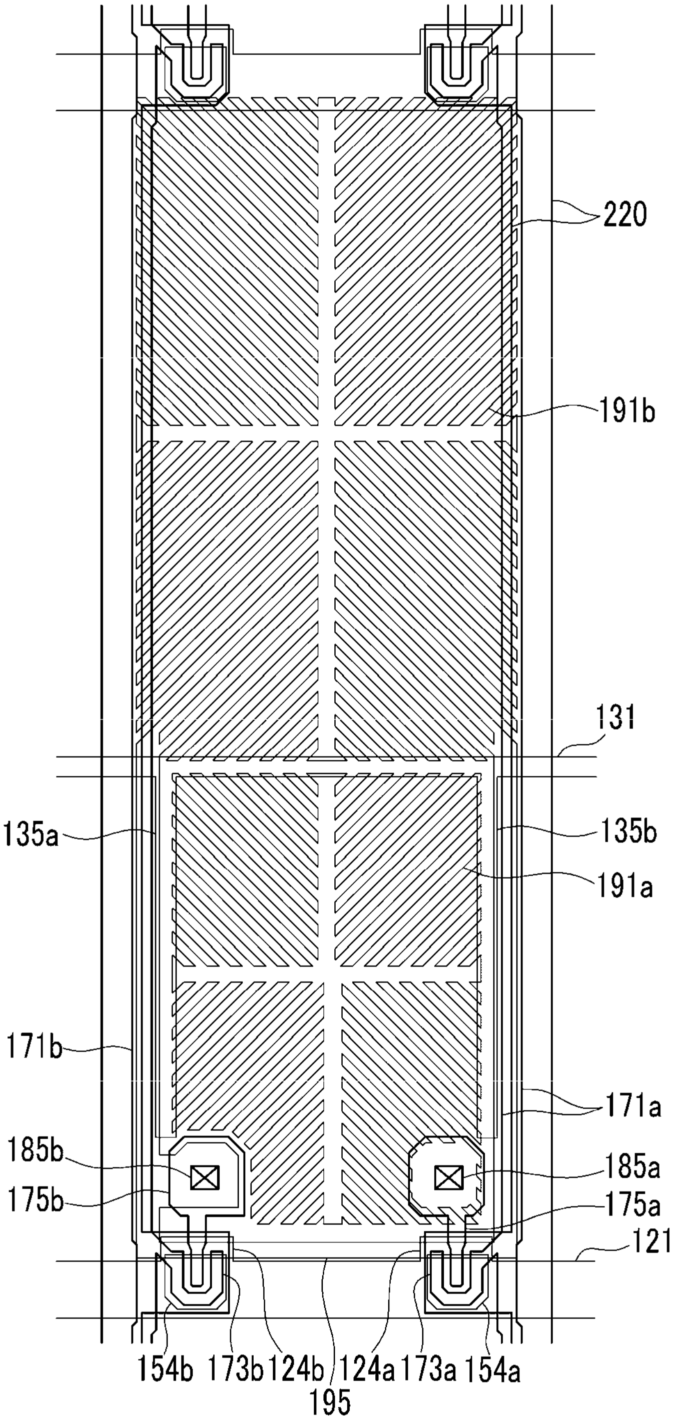
FIG. 11 is a layout view of a liquid crystal display according to another exemplary embodiment of the present invention.
Figure 12:
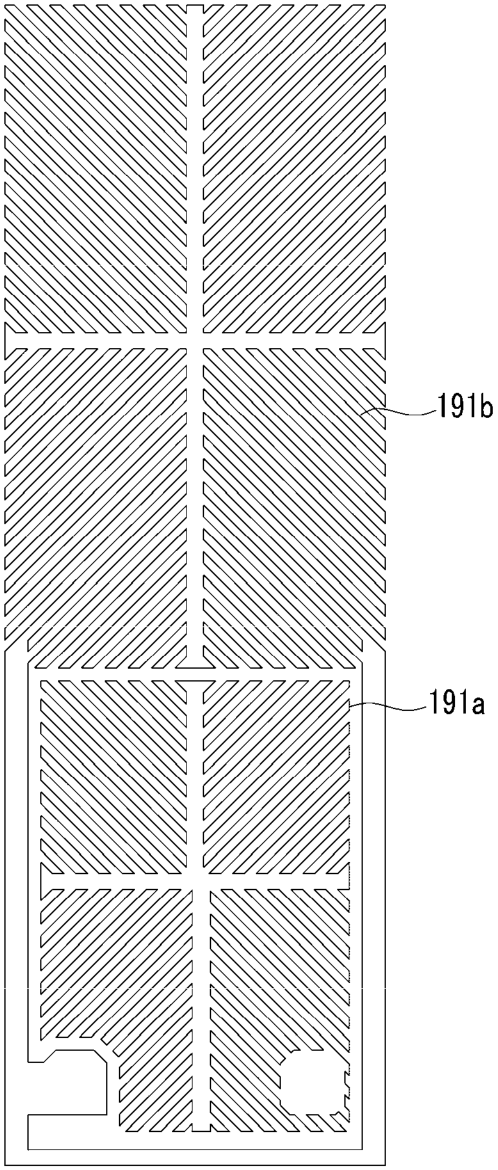
FIG. 12 is a top plan view of a pixel electrode of the liquid crystal display shown in FIG. 11.

FIG. 11 is a layout view of a liquid crystal display according to another exemplary embodiment of the present invention, and FIG. 12 is a top plan view of a pixel electrode of the liquid crystal display shown in FIG. 11.

A liquid crystal display according to the present exemplary embodiment is almost the same as the liquid crystal display shown in FIG. 8 to FIG. 10. Hereafter, different characteristics from the previously described exemplary embodiment will be mainly described.

Referring to FIG. 11 and FIG. 12, the wide end portion of the first drain electrode 175*a* to apply the data voltage to the first subpixel electrode 191*a* is disposed at the right lower corner of the first subpixel PXa, and is electrically and physically connected to the first subpixel electrode 191*a* through the contact hole 185*a*. Accordingly, when forming the color filter (not shown) through an inkjet process, the process may be easily executed and the transmittance may be improved.

Also, the storage electrodes and the openings having the wide area for forming the storage capacitors Csta and Cstb do not exist in the present exemplary embodiment, thereby increasing the aperture ratio.

As above-described, in the liquid crystal display according to the present exemplary embodiment, when the sum of the width d1 of the minute branches 194*a*, 194*b*, 194*c*, 194*d* and the interval d2 between the respective neighboring minute branches 194*a*, 194*b*, 194*c*, 194*d* is in the range of about 6 μm to 6.5 μm, the ratio d1/d2 may be in the range from about 1.2 to 1.35. When the sum of the width d1 and the interval d2 is in the range from about 6.5 μm to 7 μm, the ratio d1/d2 may be in the range from about 1.35 to 1.5. When the sum of the width d1 and the interval d2 is in the range from about 5 μm to 6 μm, the ratio d1/d2 may be in the range from about 1.05 to 1.2, and when the sum of the width d1 and the interval d2 is greater than 7 μm, the ratio d1/d2 may be greater than 1.5. Accordingly, the width d1 of the minute branches 194*a*, 194*b*, 194*c*, 194*d* is wider than the interval d2 between the respective neighboring minute branches 194*a*, 194*b*, 194*c*, 194*d*, and the ratio d1/d2 of the width d1 of the minute branches 194*a*, 194*b*, 194*c*, 194*d* to the interval d2 of the respective neighboring minute branches 194*a*, 194*b*, 194*c*, 194*d* is controlled according to the sum of the width d1 of the minute branches 194*a*, 194*b*, 194*c*, 194*d* and the interval d2 between the respective neighboring minute branches 194*a*, 194*b*, 194*c*, 194*d* such that the transmittance of the liquid crystal display may be increased while inclining the liquid crystal molecule in the length direction of the minute branches 194*a*, 194*b*, 194*c*, 194*d*.

Next, another exemplary embodiment of the present invention will be described with reference to FIG. 13 and FIG. 14.

Figure 13:
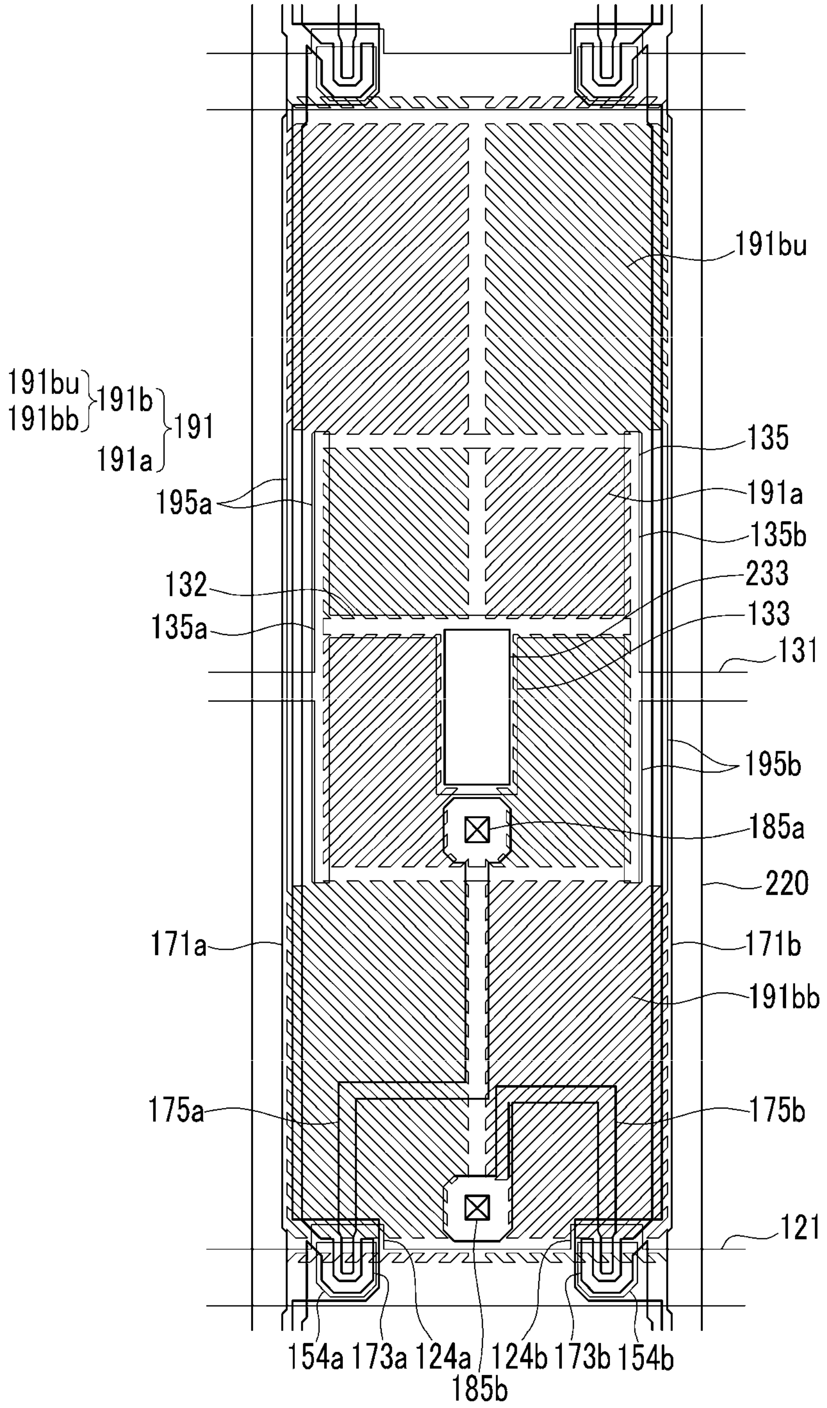
FIG. 13 is a layout view of a liquid crystal display according to another exemplary embodiment of the present invention.
Figure 14:
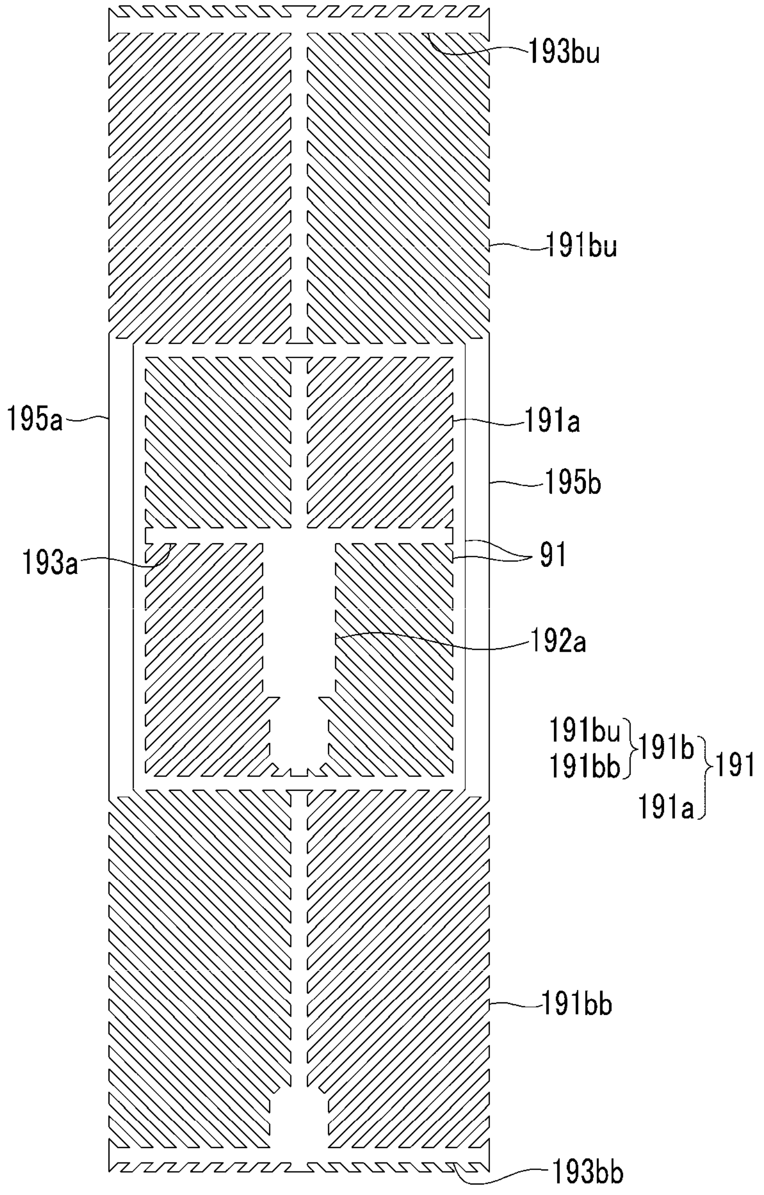
FIG. 14 is a top plan view of a pixel electrode of the liquid crystal display shown in FIG. 13.

FIG. 13 is a layout view of a liquid crystal display according to another exemplary embodiment of the present invention, and FIG. 14 is a top plan view of a pixel electrode of the liquid crystal display shown in FIG. 13.

The layered structure of the liquid crystal display according to the present exemplary embodiment is almost the same as the layered structure of the liquid crystal display shown in FIG. 2 to FIG. 4. Hereafter, different characteristics from the previously described exemplary embodiment will be mainly described.

Referring to FIG. 13 and FIG. 14, the storage electrode line 131 includes a left longitudinal portion 135*a* and a right longitudinal portion 135*b* extending upward and downward from the storage electrode line 131, a transverse connection 132 connected between the two longitudinal portions 135*a* and 135*b*, and a storage electrode 133 protruding from the center of the transverse connection 132 to the lower direction and having a wide area.

The color filters (not shown) have through holes (not shown) where contact holes 185*a* and 185*b* are passed through and an opening 233 disposed on the storage electrode 133, and an upper passivation layer (not shown) and a lower passivation layer (not shown) have a plurality of contact holes 185*a* and 185*b* exposing the first and second drain electrodes 175*a* and 175*b*.

The pixel electrode 191 also includes the first subpixel electrode 191*a* and second subpixel electrode 191*b* that are separated from each other by a gap 91 of a quadrangular belt shape therebetween.

The first subpixel electrode 191*a* is made of one basic electrode 199 shown in FIG. 5. The lower portion of the longitudinal stem of the first subpixel electrode 191*a* is extended left and right to form an expansion 192*a*, and the expansion 192*a* overlaps the storage electrode 133 in the opening 233 to form a storage capacitor Csta.

The second subpixel electrode 191*b* includes an upper electrode 191*bu* and a lower electrode 191*bb*, and the upper electrode 191*bu* and the lower electrode 191*bb* are connected through a left connection 195*a* and a right connection 195*b*.

Two longitudinal portions of the storage electrode line 131 overlap the gap 91 such that they block light leakage between the first subpixel electrode 191*a* and the second subpixel electrode 191*b* and prevent crosstalk between the first subpixel electrode 191*a* and the data lines 171*a* and 171*b*. Also, the transverse connection 132 of the storage electrode line 131 covers the texture near the transverse stem 193*a* of the first subpixel electrode 191*a*, thereby improving the aperture ratio.

As above-described, in the liquid crystal display according to the present exemplary embodiment, when the sum of the width d1 of the minute branches 194*a*, 194*b*, 194*c*, 194*d* and the interval d2 between the respective neighboring minute branches 194*a*, 194*b*, 194*c*, 194*d* is in the range from about 6 μm to 6.5 μm, the ratio d1/d2 may be in the range from about 1.2 to 1.35. When the sum of the width d1 and the interval d2 is in the range from about 6.5 μm to 7 μm, the ratio d1/d2 may be in the range from about 1.35 to 1.5. When the sum of the width d1 and the interval d2 is in the range from about 5 μm to 6 μm, the ratio d1/d2 may be in the range from about 1.05 to 1.2, and when the sum of the width d1 and the interval d2 is greater than 7 μm, the ratio d1/d2 may be greater than 1.5. Also, the width d1 of the minute branches 194*a*, 194*b*, 194*c*, 194*d* is wider than the interval d2 between the respective neighboring minute branches 194*a*, 194*b*, 194*c*, 194*d*, and the ratio d1/d2 of the width d1 of the minute branches 194*a*, 194*b*, 194*c*, 194*d* to the interval d2 of the respective neighboring minute branches 194*a*, 194*b*, 194*c*, 194*d* is controlled according to the sum of the width d1 of the minute branches 194*a*, 194*b*, 194*c*, 194*d* and the interval d2 between the respective neighboring minute branches 194*a*, 194*b*, 194*c*, 194*d* such that the transmittance of the liquid crystal display may be increased while inclining the liquid crystal molecule in the length direction of the minute branches 194*a*, 194*b*, 194*c*, 194*d*.

In the present exemplary embodiment, differently from the exemplary embodiment shown in FIG. 2, FIG. 3 and FIG. 4, a transverse stem 193*bu* of the upper electrode 191*bu* is not disposed on the central part of the upper electrode 191*bu*, but is proximate the upper edge, and the transverse stem 193*bb* of the lower electrode 191*bb* is disposed proximate the lower edge of the lower electrode 191*bb*. Accordingly, two of the subregions among the four subregions Da, Db, Dc, Dd of the basic electrode 199 of FIG. 5 as above-described almost disappear under the upper electrode 191*bu* and the lower electrode 191*bb*, and remain dummies. However, the subregions Da, Db, Dc, Dd of four directions still exist in the second subpixel electrode 191*b* such that the inclined direction of the liquid crystal molecules 310 may be various.

In this case, the area of the two remaining subregions Dc and Dd of the upper electrode 191*bu* may be greater than 1.5 times the area of the two subregions Da and Db that become small. The area of the two remaining subregions Da and Db of the lower electrode 191*bb* may be greater than 1.5 times the area of the two subregions Dc and Dd that become small.

Also, the width in the upper and lower direction of the two subregions Da and Db of the upper electrode 191*bu* and the two subregions Dc and Dd of the lower electrode 191*bb* may be about 5 μm.

Like the present exemplary embodiment, two subregions Da and Db of the upper electrode 191*bu* or two subregions Dc and Dd of the lower electrode 191*bb* overlap the gate line 121 as the dummy shape such that the aperture ratio and the transmittance may be increased and the texture may be covered near the transverse stems 193*bu* and 193*bb*.

In the present exemplary embodiment, as in the previously-described exemplary embodiment, the liquid crystal molecules are inclined in four directions such that the viewing angle of the liquid crystal display may be increased, and the liquid crystal molecules are pretilted through the polymerization of the prepolymer to thereby improve the response speed. Also, the first and second subpixel electrodes 191*a* and 191*b* are applied with different data voltages to thereby improve the side visibility.

Differently from an exemplary embodiment of the present invention, a light alignment method in which light such as ultraviolet rays is obliquely irradiated to the alignment layers 11 and 21 may be used to control the alignment direction and the alignment angle of the liquid crystal molecules 310 as a means for forming a plurality of subregions Da, Db, Dc, Dd where the liquid crystal molecules 310 are inclined in the different directions. In this case, the minute branches 194*a*, 194*b*, 194*c*, 194*d* of the pixel electrodes 191 are not necessary such that the aperture ratio may be increased and the response time may be improved by the pretilt of the liquid crystal molecule 310 that is generated by the light alignment.

Figure 15:
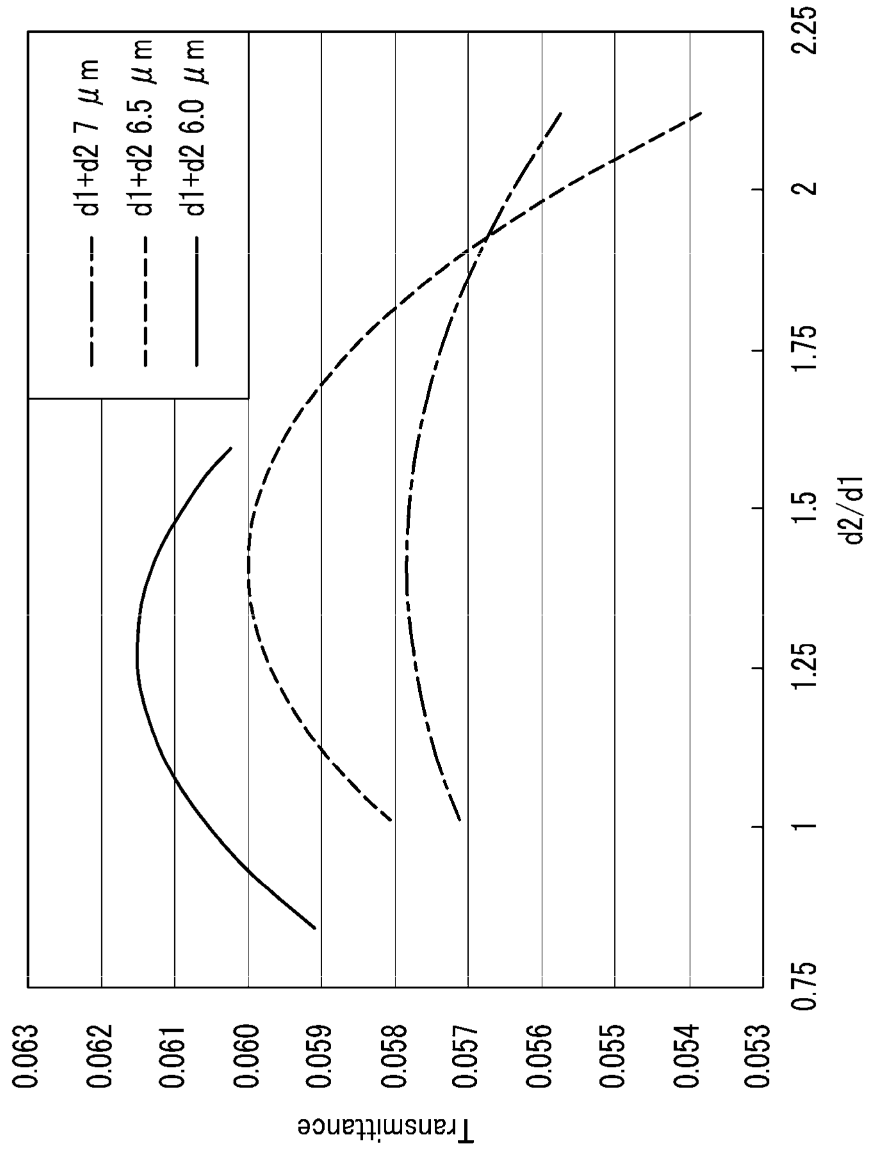
FIG. 15 is a graph showing a transmittance result of a liquid crystal display according to one experimental example of the present invention.

Next, the transmittance of the liquid crystal display changed according to the sum of the width d1 of the minute branches 194*a*, 194*b*, 194*c*, 194*d* and the interval d2 between the respective neighboring minute branches 194*a*, 194*b*, 194*c*, 194*d*, and the ratio d1/d2 of the width d1 of the minute branches 194*a*, 194*b*, 194*c*, 194*d* to the interval d2 of the respective neighboring minute branches 194*a*, 194*b*, 194*c*, 194*d* will be described with reference to FIG. 15 in one experimental example of the present invention. FIG. 15 is a graph showing a transmittance result of a liquid crystal display according to one experimental example of the present invention.

Generally, factors applied to influence the transmittance of the liquid crystal display may be divided into a first factor, a second factor, and a third factor. The first factor is the shape of the signal lines such as the gate line or the data line and the shape of the constituent elements that block the light such as the black matrix. The first factor is the main factor changing the aperture ratio of the liquid crystal display. The second factor is the size of a cell gap, a dielectric rate of the liquid crystal, and the applied voltage. The cell gap is the gap between the upper panel 200 and the lower panel 100 filled in with the liquid crystal layer 3. Generally, when the cell gap, the dielectric rate of the liquid crystal, or the applied voltage is increased, the transmittance of the liquid crystal display is increased. Finally, the third factor is the structure of the pixel itself that is largely applied to the change of the transmittance of the liquid crystal display in the case of the vertical alignment liquid crystal display. Among these three factors, the first factor and the second factor may greatly influence the different constituent elements of the liquid crystal display such that change of the first factor and the second factor is difficult, however the third factor is changed according to the design of the pixel electrode such that the change is relatively easy. Also, it is possible for the transmittance of the liquid crystal display to be changed in the range of about 10% to 15% by the third factor.

In the present experimental example, in the state in which the various conditions such as the cell gap of the liquid crystal display, the physical characteristic of the liquid crystal layer, and the driving voltage are all the same, the transmittance of the liquid crystal display is measured as shown in FIG. 15 while changing the sum (d1+d2) of the width d1 of the minute branches 194*a*, 194*b*, 194*c*, 194*d* and the interval d2 between the respective neighboring minute branches 194*a*, 194*b*, 194*c*, 194*d*, and the ratio d1/d2 of the width d1 of the minute branches 194*a*, 194*b*, 194*c*, 194*d* to the interval d2 between the respective neighboring minute branches 194*a*, 194*b*, 194*c*, 194*d*.

Referring to FIG. 15, as the sum d1+d2 is increased, it may be confirmed that the ratio d1/d2 that has the high transmittance is increased.

Also, referring to FIG. 15, it may be confirmed that when the sum d1+d2 is about 6.0 μm, and the ratio d1/d2 is about 1.28, the transmittance of the liquid crystal display is highest, when the sum d1+d2 is about 6.5 μm, and the ratio d1/d2 is about 1.42, the transmittance of the liquid crystal display is highest, and when the sum d1+d2 is about 7.0 μm, and the ratio d1/d2 is about 1.45, the transmittance of the liquid crystal display is highest. Accordingly, it may be confirmed that as the sum d1+d2 of the width d1 of the minute branches 194*a*, 194*b*, 194*c*, 194*d* and the interval d2 between the respective minute branches 194*a*, 194*b*, 194*c*, 194*d* is increased, and when the ratio d1/d2 of the width d1 of the minute branches 194*a*, 194*b*, 194*c*,194*d* to the interval d2 between the respective neighboring minute branches 194*a*, 194*b*, 194*c*,194*d* is increased, the transmittance of the liquid crystal display is increased.

Also, referring to the graph of FIG. 15, like the liquid crystal display according to an exemplary embodiment of the present invention, when the sum d1+d2 is about 6 μm to 6.5 μm, the ratio d1/d2 is about 1.2 to 1.35, when the sum d1+d2 is about 6.5 μm to 7 μm, the ratio d1/d2 about 1.35 to 1.5, when the sum d1+d2 is about 6 μm, the ratio d1/d2 is in the range from about 1.05 to 1.2, and when the sum d1+d2 is greater than 6 μm, the ratio d1/d2 is greater than 1.5, the transmittance is decreased by 10% to 20% compared with the maximum transmittance.

According to the liquid crystal display of an exemplary embodiment of the present invention, the pixel electrode may be formed for the width d1 of the minute branches 194*a*, 194*b*, 194*c*,194*d* to be wider than the interval d2 between the respective minute branches 194*a*, 194*b*, 194*c*,194*d*, and to have the ratio d1/d2 of the width d1 of the minute branches 194*a*, 194*b*, 194*c*,194*d* to the interval d2 between the respective neighboring minute branches 194*a*, 194*b*, 194*c*,194*d* according to the sum of the width d1 of the minute branches 194*a*, 194*b*, 194*c*,194*d* and the interval d2 between the respective neighboring minute branches 194*a*, 194*b*, 194*c*, 194*d* for the high transmittance pixel electrode such that it is controlled that the liquid crystal molecules are inclined in the length direction of the minute branches 194*a*, 194*b*, 194*c*, 194*d* and the transmittance of the liquid crystal display may be increased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:

a pixel electrode comprising a first subpixel electrode and a second subpixel electrode with a gap therebetween;

a common electrode facing the pixel electrode; and a liquid crystal layer disposed between the pixel electrode and the common electrode, and comprising a plurality of liquid crystal molecules, wherein the first subpixel electrode and the second subpixel electrode include a plurality of minute branches, the first subpixel electrode and the second subpixel electrode comprise a plurality of subregions having different length directions of the minute branches, a width of each of the minute branches is wider than an interval between neighboring minute branches, and a sum of the width d1 of each of the minute branches and the interval d2 between the neighboring minute branches is in a range from about 5 μm to 7 μm, when the sum of the width d1 of each of the minute branches and the interval d2 between the neighboring minute branches is in a range from 6 μm to 6.5 μm, a ratio d1/d2 of the width d1 to the interval d2 is in a range from 1.2 to 1.35, when the sum of the width d1 of each of the minute branches and the interval d2 between the neighboring minute branches is in a range from 6.5 μm to 7 μm, the ratio d1/d2 is in a range from 1.35 to 1.5, and when the sum of the width d1 of each of the minute branches and the interval d2 between the neighboring minute branches is in a range from 5 μm to 6 μm, the ratio d1/d2 is in a range from 1.05 to 1.2.

2. The liquid crystal display of claim 1, wherein the liquid crystal molecules are aligned with a pretilt along the length direction of the minute branches.

3. The liquid crystal display of claim 2, wherein the liquid crystal layer further comprises polymers to pretilt the liquid crystal molecules, and the polymers are formed by irradiating ultraviolet rays to prepolymers of monomers.

4. The liquid crystal display of claim 1, further comprising an alignment layer formed on the pixel electrode or the common electrode, wherein the alignment layer is light-aligned along the length direction of the minute branches.

5. The liquid crystal display of claim 1, wherein the first subpixel electrode and the second subpixel electrode further comprise a transverse stem and a longitudinal stem forming a boundary of the subregions, and the minute branches of the first subpixel electrode and the second subpixel electrode start from the transverse stem or the longitudinal stem and extend toward edges of the first subpixel electrode and the second subpixel electrode, respectively.

6. The liquid crystal display of claim 1, wherein the voltage of the first subpixel electrode is higher than the voltage of the second subpixel electrode.

7. The liquid crystal display of claim 6, wherein the first subpixel electrode and the second subpixel electrode are applied with different data voltages provided from information of one image.

8. The liquid crystal display of claim 1, wherein at least one of the first subpixel electrode and the second subpixel electrode further comprises four subregions having different length directions of the minute branches.

9. The liquid crystal display of claim 8, wherein the areas of the four subregions are different from each other in the first subpixel electrode or the second subpixel electrode.

10. The liquid crystal display of claim 8, wherein at least one of the first subpixel electrode and the second subpixel electrode further comprises a transverse stem and a longitudinal stem forming the boundaries of the four subregions.

11. The liquid crystal display of claim 10, wherein the area of two subregions disposed at a left side or a right side with respect to the longitudinal stem of the first subpixel electrode or the second subpixel electrode is 1.5 times greater than the area of the remaining two subregions disposed at the opposite side with respect to the longitudinal stem.

12. The liquid crystal display of claim 1, wherein the second subpixel electrode further comprises an upper electrode disposed above the first subpixel electrode, and a lower electrode disposed below the first subpixel electrode.

13. The liquid crystal display of claim 1, wherein the second subpixel electrode further comprises a connection disposed at the left side or the right side of the first subpixel electrode and connecting an upper electrode and a lower electrode of the second subpixel, wherein the upper electrode is disposed above the first subpixel electrode, and the lower electrode is disposed below the first subpixel electrode.

14. The liquid crystal display of claim 13, further comprising:

a first signal line and a second signal line;

a third signal line and a fourth signal line crossing the first signal line and the second signal line;

a first switching element connected to the first signal line and the third signal line to transmit a data voltage from the third signal line to the first subpixel electrode; and a second switching element connected to the first signal line and the fourth signal line to transmit a data voltage from the fourth signal line to the second subpixel electrode, wherein the connection covers the third signal line or the fourth signal line.

15. The liquid crystal display of claim 14, wherein the second subpixel electrode further comprises a connection bridge enclosing the first subpixel electrode, and the connection bridge overlaps a portion of the first signal line, the third signal line, or the fourth signal line.

16. The liquid crystal display of claim 1, wherein the liquid crystal molecules are aligned with a pretilt along the length direction of the minute branches, and the liquid crystal layer further comprises polymers to pretilt the liquid crystal molecules, and the polymers are formed by irradiating ultraviolet rays to prepolymers of monomers.

17. The liquid crystal display of claim 1, further comprising an alignment layer formed on the pixel electrode or the common electrode, wherein the alignment layer is light-aligned along the length direction of the minute branches.

* * * * *